United States Patent [19]

Hiruma

[11] B 4,076,275

[45] Feb. 28, 1978

[54] VEHICLE HYDROPNEUMATIC SUSPENSION SYSTEM WITH VEHICLE BODY HEIGHT CONTROL MEANS

[76] Inventor: Mituo Hiruma, 2-693, Hanakoganei, Kodaira, Tokyo, Japan

[21] Appl. No.: 471,706

[22] Filed: May 20, 1974

[44] Published under the second Trial Voluntary Protest Program on March 16, 1976 as document No. B 471,706.

[30] Foreign Application Priority Data

May 21, 1973   Japan ................................ 48-55521

[51] Int. Cl.² ............................................. B60G 11/28
[52] U.S. Cl. ............................... 280/124 F; 267/65 D
[58] Field of Search .......................... 280/124 F, 6 H; 267/64 R, 64 A, 65 R, 65 D

[56] References Cited

U.S. PATENT DOCUMENTS

| 2,974,675 | 3/1961  | Engfer ...................................... 280/70 7 |
| 3,035,853 | 5/1962  | Klein ....................................... 280/70 G |
| 3,632,131 | 1/1972  | Cislo ...................................... 267/65 D |
| 3,704,895 | 12/1972 | Remaud ............................. 280/124 F |
| 3,729,211 | 4/1973  | Engfer ............................... 280/124 F |
| 3,820,818 | 6/1974  | Kress ....................................... 267/64 |
| 3,831,969 | 8/1974  | Lindblom ........................... 280/6 H |

FOREIGN PATENT DOCUMENTS

| 1,260,844 | 1/1972 | United Kingdom ................... 280/689 |
| 1,319,673 | 6/1973 | United Kingdom .................... 707/48 |

Primary Examiner—Philip Goodman
Assistant Examiner—John A. Carroll

[57] ABSTRACT

A sensor senses the height of the vehicle body above the road surface by sensing the angular rotation of the stabilizer bar, and fluid is pumped into or drained out of hydraulic adjustors to maintain the height at a manually adjustable selected level.

7 Claims, 6 Drawing Figures

VEHICLE HYDROPNEUMATIC SUSPENSION SYSTEM WITH VEHICLE BODY HEIGHT CONTROL MEANS

The present invention relates to a fluid operated hydropneumatic suspension system for a body of a motor vehicle with means for maintaining the height of the vehicle body above the road surface at a manually selectable level.

It is known in the prior art to provide a hydropneumatic suspension system for a vehicle body to maintain it at a certain height above the road surface regardless of the load the vehicle is carrying. Such a system usually includes hydraulic adjustors in mechanical series with air springs connected between the vehicle wheel axes and the vehicle body, and valves to selectively communicate the adjustors with a hydraulic pump or a fluid reservoir to pump fluid into or drain fluid out of the adjustors to raise or lower the vehicle body respectively. Valves are usually built into the adjustors to control the flow of fluid into or out of the adjustors to maintain the vehicle body at a selected level. Means may also be built into the adjustors to select the vehicle body height. However, each of the adjustment means must be adjusted separately to adjust the operating level of the respective adjustor, and the adjustors are necessarily large in size and high in cost. It is also quite time consuming and inconvenient to adjust each adjustor separately.

It is therefore an important object of the present invention to provide an improved hydropneumatic suspension system for a vehicle body in which only one sensor is provided to sense the height of the vehicle body above the road surface which sensor is remote from the adjustors.

It is another important object of the present invention to provide an improved hydropneumatic suspension system for a vehicle body including means for selectively adjusting the height of the vehicle body above the road surface from within the vehicle occupant compartment.

The above and other objects, features and advantages of a hydropneumatic suspension system of a vehicle body embodying the present invention will become more apparent from the following detailed description taken in conjunction with the accompanying drawings, in which.

Figure 1:
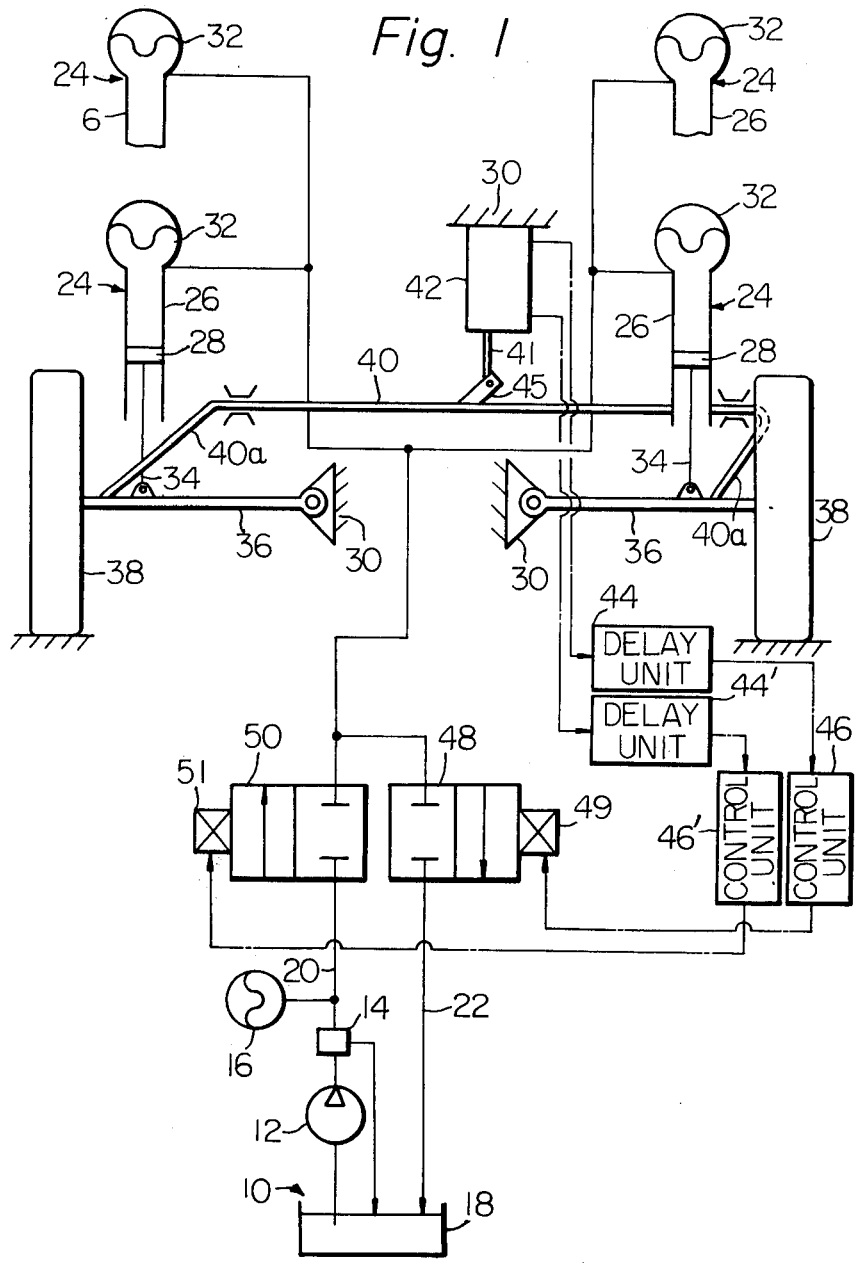
FIG. 1 is a schematic view of a hydropneumatic suspension system of a vehicle body embodying the present invention.

Referring now to FIG. 1, a hydropneumatic suspension system of a vehicle body embodying the present invention includes a source 10 of hydraulic fluid under pressure having a pump 12, a pressure control or by-pass valve 14, and an accumulator 16. The pump 12 receives fluid from a reservoir 18, with which the by-pass valve 14 also communicates. The reservoir 18 of the source 10 communicates through the pump 14 and a pressure line 20 and a drain line 22 respectively with adjustors 24, one for each wheel of the vehicle in this embodiment, four. Each adjustor 24 includes a hydraulic cylinder 26 in which a piston 28 is slidable. The cylinder 26 is attached to a structural member of the vehicle body 30 (connection not shown) through an air spring 32 which acts as a shock absorber. A piston rod 34 extends from the piston 28 and is pivotally connected to an axle 36 carried by a wheel 38.

An anti-roll or stabilizer bar 40 is axially rotatably mounted on the vehicle body 30 between the wheels 38 on opposite sides of the vehicle body 30 in a conventional manner. The invention makes novel use of the fact that the angular orientation or rotation of the stabilizer bar 40 is analogous to the height of the vehicle body 30 above the road surface, since arms 40a of the stabilizer bar 40 act as levers the ends of which are connected to the axles 36. A sensor 42 is adjustably mounted on the vehicle body 30 to sense the angular position of the stabilizer bar 40 and thereby the height of the vehicle body 30 above the road surface through a plate 45 attached to the bar 40 and a rod 41 pivotally connected to the plate 45 and the sensor 42. The sensor 42 feeds an electrical height signal to a delay unit 44 when the height of the vehicle body 30 is above a predetermined range, and an electrical height signal to another delay unit 44' when the height of the vehicle body 30 is below the predetermined range. The outputs of the delay units 44 and 44' are connected to respective coils 49 and 51 of solenoid valves 48 and 50 through control units 46 and 46' respectively. The delay units 44 and 44' and the control units 46 and 46' are identical in construction and constitute two identical channels. The solenoid valve 50 is normally closed and connected between the source 10 and the adjustors 24, and the solenoid valve 48 is also normally closed and is connected between the reservoir 18 and the adjustors 24. The solenoid coils 49 and 51, when energized, open the respective solenoid valves 48 and 50.

Figure 2:
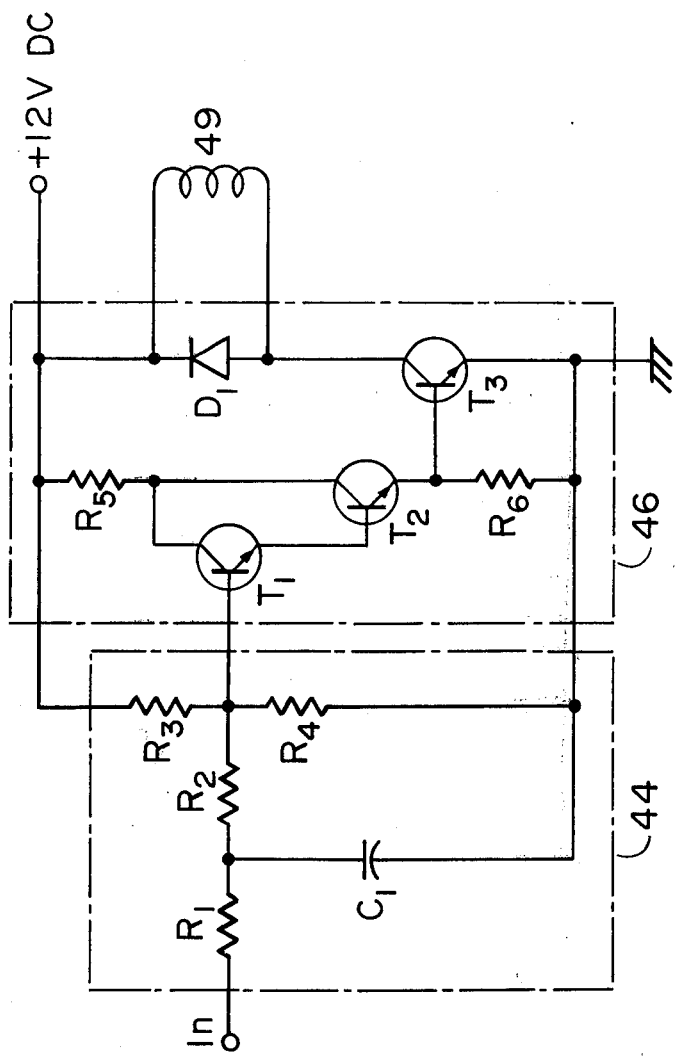
FIG. 2 is an electrical schematic diagram of part of the system of FIG. 1.

FIG. 2 shows the delay unit 44, the control unit 46 and the solenoid coil 49. The delay unit 44 comprises a resistor $R_1$ having one end connected to an input terminal In leading to the sensor 42 and the other end connected to ground through a capacitor $C_1$. The junction between the resistors $R_1$ and the capacitor $C_1$ also leads to ground through resistors $R_2$ and $R_4$. The junction between the resistors $R_2$ and $R_4$ is connected to the base of an NPN transistor $T_1$ and also to a 12V DC car battery (not shown) through a resistor $R_3$. The collector of the transistor $T_1$ is connected to the 12V DC battery through a resistor $R_5$, and its emitter is connected to the base of an NPN transistor $T_2$. The collector of the transistor $T_2$ is connected to the 12V DC battery through the resistor $R_5$, and its emitter is connected to ground through a resistor $R_6$. The emitter of the transistor $T_2$ is also connected to the base of an NPN transistor $T_3$. The collector of the transistor $T_3$ is connected to the 12V DC battery through a diode $D_1$, and its emitter is connected directly to ground. The coil 49 of the solenoid valve 48 is connected across the diode $D_1$.

The resistors $R_3$ and $R_4$ act as a voltage divider to bias the base of the transistor $T_1$ to a suitable voltage in the cut-off region. The resistor $R_1$ and capacitor $C_1$ constitute an integrating circuit to integrate the electrical height signal from the sensor 42 with respect to a function of time. The transistor $T_1$ and associated components act as a level detector to switch on the transistor $T_3$, which acts as a power transistor, when the integrated level of the electrical signal exceeds the cut-off voltage of the transistor $T_1$.

Figure 3:
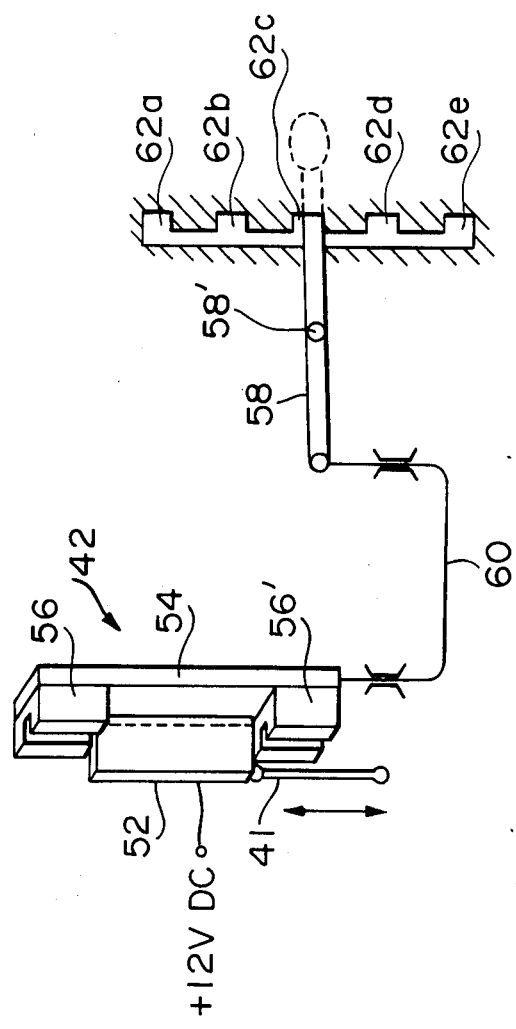
FIG. 3 is a perspective view of a first embodiment of a sensor of the system of FIG. 1.

The operation of the system will now be described with reference also to FIG. 3, which shows one preferred embodiment of the sensor 42.

The sensor 42 is vertically adjustably mounted on the vehicle body 30 adjacent to the stabilizer bar 40, and includes a movable contact member 52 pivotally connected to the stabilizer bar 40 by means of the plate 45 rotatable with the stabilizer bar 40 and link 41 pivotally connected at its one end to the plate 45 and the other end to the movable contact member 52. The arrangement is such that rotation of the stabilizer bar 40 and thereby the plate 45 results in analogous vertical movement of the movable contact member 52, and the movement of the contact member 52 relative to the vehicle body 30 depends on the height of the vehicle body 30 above the road surface. A plate 54 is slidable in vertical grooves (not shown) in the vehicle body 30 and contact members 56 and 56' are fixed thereto and electrically insulated therefrom. The vertical position of the plate 54 is adjustable by means of a lever 48 having an intermediate pivot point 58' and a cable 60 connecting the end of the lever 58 to the plate 54 in a well known manner. The lever 58 is engageable in notches 62a, 62b, 62c, 62d and 62e formed in, for example, the bottom of the dashboard in the vehicle occupant compartment (not shown). Although the number of notches shownn is five, any number can be provided, or the notches can be replaced by a friction or similar member to hold the lever 58 in any selected position. The movable member 52 is connected to the battery, and is mechanically engageable with either one of the members 56 and 56'. The member 56 is connected to the input terminal In of the delay unit 44, and the member 56' is connected to an identical input terminal (not shown) of the delay unit 44'. The vertical distance between the memberes 56 and 56' is greater than the height of the movable member 52.

In operation, the vehicle operator selects the desired height of the vehicle body 30 above the road surface by engaging the lever 58 in one of the notches, here shown as the notch 62c. This is easily accomplished since the lever 58 can be arranged within the occupant compartment. Thus, the height of the plate 54 and accordingly the members 56 and 56' are adjusted relative to the vehicle body 30, and the vehicle body 30 will assume the desired height above the road surface.

If, for example, a vehicle occupant leaves the vehicle and/or removes luggage, the height of the vehicle body 30 above the road surface will rise due to the reduced load on the air springs 32. In this case, the plate 45 will rotate upwards as viewed in FIG. 1 thereby moving the movable member 52 upwards through the link 41 to contact the member 56. As a result +12V DC will be applied to the terminal In of the delay unit 44 and the capacitor $C_1$ will begin to charge through the resistor $R_1$ at a rate determined by the time constants of the resistor $R_1$ and the capacitor $C_1$. When the voltage at the base of the transistor $T_1$, which is proportional to the output voltage of the delay unit 44, exceeds the cut-off point of the transistor $T_1$, the transistors $T_1$, $T_2$ and $T_3$ will conduct and current will flow through the solenoid coil 49. This will cause the solenoid valve 48 to open and connect the adjustors 24 to the reservoir to drain fluid thereinto and lower the vehicle body 30 level. When the vehicle body 30 has been lowered to the selected level, the movable member 52 will be moved downwards by the plate 45 and link 41 and disengage from the member 56. The capacitor $C_1$ will then begin to discharge through the resistors $R_2$ and $R_3$, and when the base voltage of the transistor $T_1$ drops below the cut-off point, the transistors $T_1$, $T_2$ and $T_3$ will be cut-off and the solenoid coil 49 will be de-energized to close the solenoid valve 48. Flow of fluid from the adjustors 24 into the reservoir 18 will then cease, and the vehicle body 30 will be maintained at the desired height. During this operation, the solenoid valve 50 remains closed to block communication between the source 10 and the adjustors 24.

If the height of the vehicle body 30 drops below the selected level, a similar operation occurs such that the member 52 will engage with the member 56' to apply +12V DC to the input of the delay unit 44'. Solenoid coil 51 will be energized to open the solenoid valve 50 and connect the adjustors 24 to the source 10 to pump fluid under pressure into the adjustors 24 to extend the same and raise the vehicle body 30 level. Under this condition, the solenoid valve 48 remains closed.

The distance between the contacts 56 and 56' of the sensor 42 is desirably greater than the height of the member 52 so that the member 52 will not inadvertently engage the members 56 and 56' due to vibration of the wheels 38 relative to the vehicle body 30. It will also be understood that the solenoid valves 48 and 50 will not be inadvertently opened by instantaneous contact of the member 52 with the member 56 or 56' due to the provision of the delay units 44 and 44', since the electrical level representing signal must be fed to the delay unit 44 or 44' for a predetermined length of time which is long enough for the capacitor $C_1$ to charge to a level sufficient to raise the voltage at the base of the transistor $T_1$ above the cut-off level.

Figure 4:
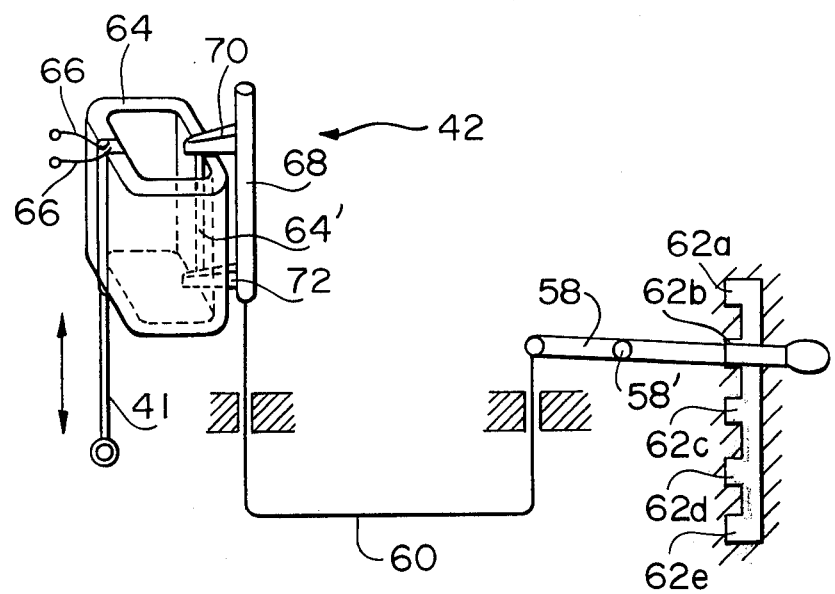
FIG. 4 is a perspective view of another embodiment of a sensor of the system of FIG. 1.

Another embodiment of the sensor 42 is shown in FIG. 4, in which the member 52 has been replaced by an electromagnet 64 connected to the battery through leads 66. If desired, the electromagnet 64 may be replaced by a permanent magnet. A control rod 68 is vertically adjustable relative to the vehicle body 30 by the lever 58 and cable 60, and carries normally open reed switches 70 and 72, each having one contact (not shown) connected to the battery. The other contact (not shown) of the reed switch 70 is connected to the input terminal In of the delay unit 44, and the other contact (not shown) of the reed switch 72 is connected to the input of the delay unit 44'. A slot 64' is formed through the electromagnet 64 through which the reed switches 70 and 72 may pass. When the height of the vehicle body 30 above the road surface is higher and lower than the selected level, the electromagnet 64 will move to a position to be adjacent to the reed switch 70 and to the reed switch 72 to close the reed switch contacts and apply +12 volts to the input terminals of the delay units 44 and 44' respectively.

Figure 5A:
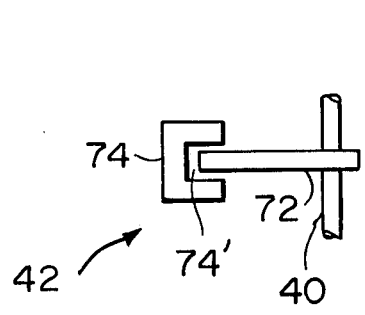
FIGS. 5a and 5b are plan and elevation views respectively of still another embodiment of a sensor of the system of FIG. 1.
Figure 5B:
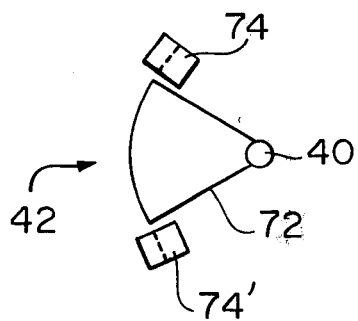

Still another embodiment of the sensor 42 is shown in FIGS. 5a and 5b. In this case, the plate 45 and link 41 are omitted, and a movable member 72 is rotatable directly with the stabilizer bar 40. Fixed contacts 74 and 74' are rotatably adjustable about the axis of the stabilizer bar 40 to select the height of the vehicle body 30 above the road surface. The contact 72 is rotatable through a groove 74'' formed in the members 74 and 74', and the level signal is fed to the delay units 44 and 44' when a portion of the member 72 extends into the member 74 or 74' respectively. The members 74 and 74' may be provided with micro-switches, ball effect generators, magneto-resistive elements, light sensitive semiconductors and sources of photocells and sources (not shown) to sense the proximity of the member 72.

What is claimed is:

1. In a fluid operated suspension system of a vehicle including a source of fluid under pressure with a fluid reservoir, adjustors disposed between the vehicle wheel axles and the body of said vehicle, valves operative to communicate the adjustors with the source and the reservoir to raise and lower the vehicle body respectively relative to a road surface and a stabilizer bar connected to at least two of the adjustors, the improvement comprising:

sensing means disposed between the vehicle body and the stabilizer bar in such a manner that a first portion of the sensing means is mounted on the vehicle body and a second portion thereof mounted on the stabilizer bar, sensing an angular orientation of the stabilizer bar relative to a longitudinal axis of the vehicle body and operative to produce an electrical signal when said angular orientation is outside a predetermined range indicating that a vehicle height above the road surface is outside a predetermined range, the first portion being adjustably mounted and substantially perpendicularly adjustable through a lever system operable by a vehicle occupant from within the vehicle in a direction along said longitudinal axis for allowing selection of the predetermined range of the vehicle height above the road surface; and control means responsive to said electrical signal and operative to actuate the valves to communicate the adjustors with one of the source and the reservoir to restore the height of the vehicle body above the road surface to within said predetermined range.

2. The improvement according to claim 1, in which said control means actuates the valves only if said sensing means produces said electrical signal for a predetermined length of time.

3. The improvement according to claim 2, in which said control means include a delay unit responsive to the output of said sensing means and a control unit responsive to the output of said delay unit.

4. The improvement according to claim 3, in which said delay unit is operative to integrate said electrical signal with respect to time, and in which said control means are operative to actuate the valves when the integrated value of said electrical signal exceeds a predetermined value.

5. The improvement according to claim 1, in which said valves include a first solenoid valve connected between the source and the adjustors and a second solenoid valve connected between the reservoir and the adjustors.

6. The improvement according to claim 1, in which the valves include a first normally closed solenoid valve connected between the source and the adjustors and a second normally closed solenoid valve connected between the reservoir and the adjustors, said sensing means are operative to produce a first electrical signal when the height of the vehicle body above the road surface is above said predetermined range and a second electrical signal when the height of the vehicle body above the road surface is below said predetermined range, and said control means are operative to feed a control signal to said second solenoid valve in response to said first electrical signal to open said second solenoid valve to drain fluid from the adjustors into the reservoir to lower the vehicle body, and operative to feed a control signal to said first solenoid valve to open said first solenoid valve in response to said second electrical signal to admit fluid from the source into the adjustors to raise the vehicle body.

7. The improvement according to claim 6, in which said control means include a first channel to control said first solenoid valve and a second channel to control said second solenoid valve.

* * * * *